US010763994B2

(12) United States Patent
Kim et al.

(10) Patent No.: US 10,763,994 B2
(45) Date of Patent: Sep. 1, 2020

(54) METHOD AND APPARATUS FOR TRANSMITTING AND RECEIVING CONTROL INFORMATION IN WIRELESS COMMUNICATION SYSTEM

(75) Inventors: Han-Ju Kim, Seoul (KR); Chae-Man Lim, Seoul (KR); Min-Goo Kim, Hwaseong-si (KR); Jong-Han Lim, Seoul (KR); Hyuk-Joon Kwon, San Diego, CA (US); Jung-Won Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 13/543,108

(22) Filed: Jul. 6, 2012

(65) Prior Publication Data
US 2013/0324117 A1  Dec. 5, 2013

(30) Foreign Application Priority Data
Jun. 4, 2012  (KR) .................. 10-2012-0060023

(51) Int. Cl.
*H04W 4/00* (2018.01)
*H04L 1/00* (2006.01)
(Continued)

(52) U.S. Cl.
CPC .......... *H04L 1/0047* (2013.01); *H04J 11/005* (2013.01); *H04L 25/03305* (2013.01); *H04L 1/1825* (2013.01); *H04W 92/20* (2013.01)

(58) Field of Classification Search
CPC ....... H04L 29/08101; H04L 29/08108; H04W 88/02; H04W 48/16; H04W 72/04; H04W 4/14
(Continued)

(56) References Cited

U.S. PATENT DOCUMENTS

2004/0166900 A1* 8/2004 Qiu ...................... H04W 72/02
455/560
2008/0153429 A1* 6/2008 Johnson ................ H04W 28/06
455/72
(Continued)

FOREIGN PATENT DOCUMENTS

CN      102027776 A    4/2011
CN      102349240 A    2/2012
(Continued)

OTHER PUBLICATIONS

Nokia Siemens Networks, et al., "Remaining issues for signalling support for CRS IC", 3GPP TSG RAN1 Meeting #69, R1-122404, May 21-25, 2012.
(Continued)

*Primary Examiner* — Matthew W Genack
(74) *Attorney, Agent, or Firm* — Jefferson IP Law, LLP

(57) ABSTRACT

Methods, a Base Station (BS), and a User Equipment (UE) in a wireless communication system for transmitting and receiving control information are provided. The method for transmitting control information by a BS in a wireless communication system includes receiving information related to a signal transmitted by a second BS that the second BS which is a neighboring BS of the first BS, determining whether a second UE using an identical resource to that used by a first UE included in a cell of the first BS exists within a cell of the second BS based on the received information, when the second UE exists, generating control information for controlling a signal transmitted to the second UE by the second BS based on the received information, and transmitting the generated control information to the first UE through a control channel.

10 Claims, 4 Drawing Sheets

(51) Int. Cl.
*H04J 11/00* (2006.01)
*H04L 25/03* (2006.01)
*H04W 92/20* (2009.01)
*H04L 1/18* (2006.01)

(58) Field of Classification Search
USPC .................. 455/414.1, 422.1, 434, 450, 466
See application file for complete search history.

(56) References Cited

U.S. PATENT DOCUMENTS

| | | | |
|---|---|---|---|
| 2008/0186949 A1* | 8/2008 | Hafeez | H04B 1/7077 370/350 |
| 2009/0279503 A1* | 11/2009 | Chin | H04W 36/0072 370/331 |
| 2010/0069012 A1* | 3/2010 | Sullivan | H04W 52/287 455/67.11 |
| 2010/0190447 A1 | 7/2010 | Agrawal et al. | |
| 2010/0232539 A1 | 9/2010 | Han et al. | |
| 2010/0255852 A1 | 10/2010 | Chen et al. | |
| 2010/0331030 A1 | 12/2010 | Nory et al. | |
| 2011/0013592 A1* | 1/2011 | Uemura | H04W 24/10 370/331 |
| 2011/0065465 A1* | 3/2011 | Kim | H04B 7/0404 455/502 |
| 2011/0124289 A1 | 5/2011 | Balachandran et al. | |
| 2011/0269459 A1* | 11/2011 | Koo | H04B 7/022 455/434 |
| 2012/0009959 A1 | 1/2012 | Yamada et al. | |
| 2012/0040701 A1* | 2/2012 | Tong | H04W 52/243 455/501 |
| 2012/0155411 A1 | 6/2012 | Ancora et al. | |
| 2012/0157140 A1 | 6/2012 | Kim et al. | |
| 2012/0201162 A1 | 8/2012 | Kim et al. | |
| 2013/0114429 A1* | 5/2013 | Jonsson et al. | 370/252 |
| 2013/0114525 A1* | 5/2013 | Ahmadi | 370/329 |
| 2015/0098433 A1 | 4/2015 | Papasakellariou et al. | |
| 2015/0215924 A1 | 7/2015 | Kwon et al. | |

FOREIGN PATENT DOCUMENTS

| | | | |
|---|---|---|---|
| EP | 1 453 341 A2 | 9/2004 | |
| EP | 2 280 492 A1 | 2/2011 | |
| EP | 2280492 A1 * | 2/2011 | .......... H04J 11/0056 |
| EP | 2 627 141 A2 | 8/2013 | |
| KR | 10-2009-0103661 A | 10/2009 | |
| KR | 10-2011-0013230 A | 2/2011 | |
| KR | 10-2011-0046231 A | 5/2011 | |
| RU | 2 439 817 C1 | 1/2012 | |
| RU | 2010 136 832 A | 3/2012 | |
| WO | 2011-003573 A1 | 1/2011 | |
| WO | 2012/062226 A2 | 5/2012 | |

OTHER PUBLICATIONS

Alcatel-Lucent Shanghai Bell, et al., "Discussion for CRS Related Functionalities under CRS Collision", 3GPP TSG RAN1 Meeting #69, R1-122476, May 21-25, 2012.

LG Electronics, "Signaling support for CRS interference handling", 3GPP TSG RAN1 Meeting #69, R1-122284, May 21-25, 2012.

Samsung, "Discussion on CRS-based CoMP", 3GPP TSG RAN1 Meeting #69, R1-122232, May 21-25, 2012.

Ritt et al., Requirements of Downlink Inter-Cell Interference Detection/Subtraction and TP, 3GPP TSG-RAN WG1 LTE Ad Hoc Meeting, Helsinki, Finland, Jan. 23-25, 2006, pp. 1-3, R1-060199.

Examination report dated Oct. 9, 2018, issued in the Chinese application No. 201711104584.7.

Chinese Examination Report dated Apr. 15, 2019, issued in Chinese Application No. 201711104584.7.

Indian Office Action dated Aug. 19, 2019; Indian Appln. No. 4/CHENP/2015.

Korean Office Action dated Dec. 3, 2019, issued in Korean Patent Application No. 10-2019-0110955.

* cited by examiner

METHOD AND APPARATUS FOR TRANSMITTING AND RECEIVING CONTROL INFORMATION IN WIRELESS COMMUNICATION SYSTEM

PRIORITY

This application claims the benefit under 35 U.S.C. § 119(a) of a Korean patent application filed in the Korean Intellectual Property Office on Jun. 4, 2012 and assigned Serial No. 10-2012-0060023, the entire disclosure of which is hereby incorporated by reference.

BACKGROUND OF THE INVENTION

1. Field of the Invention

The present invention relates to a method and an apparatus for wireless communication system. More particularly, the present invention relates to a method and an apparatus for transmitting and receiving control information in a wireless communication system.

2. Description of the Related Art

All signals and information degrading performance of a receiver of a User Equipment (UE), other than a signal which the UE desires to receive, is referred to as interference. Interference may be caused by an allocation of the same frequency resource of a UE from a serving Base Station (BS) as that allocated to another UE from a neighboring BS.

A cell radius is very small in a next generation wireless communication system, compared to an existing cellular environment, and the cell distribution is irregular due to the operation of various cells, such as a femto cell. Inter-cell interference in such an environment is a major reason performance of the UE is degraded according to a packet error.

Accordingly, in order to address a difficulty in using a point-to-point communication scheme of the related art, various interference recognition communication (i.e., interference aware cancellation) schemes have been suggested. One example of the interference recognition communication schemes includes a scheme in which a UE removes an interference signal from a reception signal by using control information for decoding the interference signal (hereinafter, referred to as "interference control information").

In order to use the interference recognition communication scheme, the UE is required to receive the interference control information on a neighboring BS from a serving BS. However, since the interference signal and a neighboring cell environment for the UE are dynamically changed in a mobile communication environment and a degree of the change becomes significant when the UE moves or a neighboring environment is changed, there is a limitation in that the UE continuously monitors whether the interference control information is received. Further, since information on an IDentifier (ID) of an interference cell or ID of an interference cell UE used for acquiring the interference control information is received over a long period, it may not be possible to acquire the interference control information for use every time according to the related art.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting and receiving control information in a wireless communication system.

Another aspect of the present invention is to provide a method and an apparatus for transmitting and receiving control information for decoding an interference signal using a common area of a control channel area in a wireless communication system.

Another aspect of the present invention is to provide a method and an apparatus for enabling a User Equipment (UE) located in each cell to reduce influence of an interference signal affecting a neighboring Base Station (BS) in a wireless communication system.

Another aspect of the present invention is to provide a method and an apparatus for discriminating and using a decoding process of an interference signal considering whether to re-transmit the interference signal.

Another aspect of the present invention is to provide a method and an apparatus for reducing an overhead according to transmission/reception of interference control information.

In accordance with an aspect of the present invention, a method for transmitting control information by a first BS in a wireless communication system is provided. The method includes receiving information related to a signal transmitted by a second BS from the second BS that is a neighboring BS of the first BS, determining whether a second UE using an identical resource to that used by a first UE included in a cell of the first BS exists within a cell of the second BS based on the received information, when the second UE exists, generating control information for controlling a signal transmitted to the second UE by the second BS based on the received information, and transmitting the generated control information to the first UE through a control channel.

In accordance with another aspect of the present invention, a BS in a wireless communication system for transmitting control information is provided. The BS includes a BS interface unit, a transmitter, and a controller. The BS interface unit is for receiving information, related to a signal transmitted by a neighbor BS, from the neighbor BS. The transmitter is for transmitting control information to a first User Equipment (UE) through a control channel. The controller is for controlling the BS interface unit and the transmitter, for determining whether a second UE using an identical resource to that used by the first UE included in a cell of the BS exists within a cell of the neighbor BS based on the received information, for, if the second UE exists, generating control information for controlling a signal transmitted to the second UE by the neighbor BS based on the received information, and for controlling to transmit the generated control information to the first UE through a control channel.

In accordance with yet another aspect of the present invention, a method for receiving control information by a first UE in a wireless communication system is provided. The method includes receiving control information from a first BS through a control channel, receiving a desired signal from the first BS and an interference signal from a second BS, the interference signal corresponding to use by a second UE within a cell of the second BS of a resource that is identical to a resource used by the first UE, decoding the control information to acquire interference information for controlling of the interference signal, and, when the interference information for one of decoding and detecting the interference signal is acquired, decoding the desired signal and using the acquired interference information to mitigate the interference signal.

In accordance with still another aspect of the present invention, a UE in a wireless communication system for receiving control information is provided. The UE includes a receiver and a controller. The receiver is for receiving control information from a first BS through a control channel, for receiving a desired signal from the first BS, and for receiving an interference signal from a second BS, the interference signal corresponding to use by a another UE within a cell of the second BS of a resource that is identical to a resource used by the UE. The controller is for controlling the receiver, for decoding the control information to acquire interference information for controlling of the interference signal, and for, when the interference information for one of decoding and detecting the interference signal is acquired, decoding the desired signal and using the acquired interference information to mitigate the interference signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
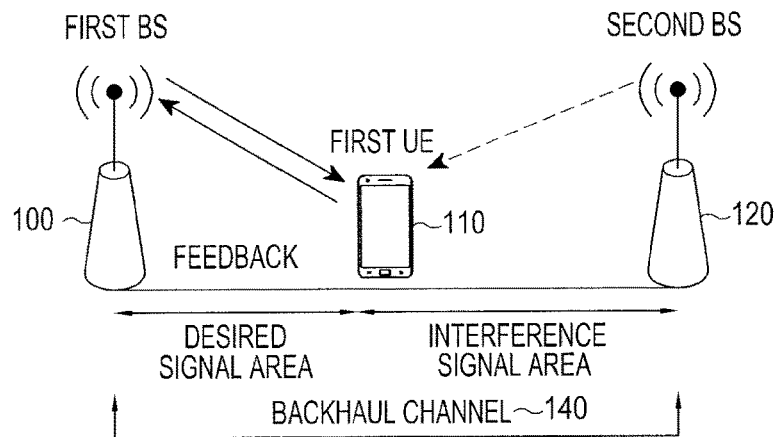
FIG. 1 is a diagram illustrating a wireless communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for transmitting/receiving interference control information in a wireless communication system. More particularly, exemplary embodiments of the present invention provide a method and an apparatus in which a User Equipment (UE) located in each cell detects an interference signal for a neighboring Base Station (BS) and removes the interference signal from a reception signal in a wireless communication system including a plurality of BSs.

In an exemplary embodiment of the present invention, a serving BS transmits information on a transmission scheme used for determining a characteristic of a transmission signal of a neighboring BS to a UE of a serving cell as control information for decoding an interference signal (hereinafter, referred to as "interference control information"). Further, in the exemplary embodiments of the present invention, a technique for using the interference control information based on a mobile communication standard, and a method and an apparatus for efficiently reducing interference by discriminating initial transmission and re-transmission in a wireless communication system using, for example, a Hybrid Automatic Retransmit Request (HARQ) scheme are suggested.

In the meantime, an example of the wireless communication system according to the exemplary embodiments of the present invention includes a wireless communication system, such as Global System for Mobile communications (GSM), a Wideband Code Division Multiple Access (WCDMA) system, Universal Mobile Telecommunications System (UMTS), and a Long Term Evolution (LTE) system, requiring an interference control.

Hereinafter, prior to explaining the exemplary embodiments of the present invention, a wireless communication system will be described.

FIG. 1 is a diagram illustrating a wireless communication system according to the related art.

Referring to FIG. 1, the wireless communication system includes a first BS 100, a first UE 110 for receiving a signal from the first BS 100, a second BS 120 which is a neighboring BS of the first BS 100, and a second UE (not shown) for receiving a signal from the second BS 120.

Since the first BS 100 is a serving BS of the first UE 110, the second BS 120 may be an interference BS generating interference to the first UE 110. That is, when the second BS 120 transmits a signal to the second UE by using the same resource as a resource used by the first UE 110, the signal transmitted from the second BS 120 may be received in the first UE 110 as the interference signal according to a location of the first UE 110 and transmission power of the second BS 120. As such, since the first UE 110 may receive an unintended interference signal, a reception performance of the first UE 110 is determined based on a strength of the interference signal. This will be described in detail below.

Equations 1 and 2 simply represent a reception signal of the first UE 110.

$$y = \sqrt{p_D} h^D x^D + n \tag{1}$$

$$y = \sqrt{p_D} h^D x^D + \sqrt{P_I} h^I x^I + n \tag{2}$$

Equation (1) represents a desired signal which the first UE 110 receives and equation (2) represents the desired signal and the interference signal which the first UE 110 receives. For example, equation (1) represents the signal which the first UE 110 receives from the first BS 100 that is the serving BS, and equation (2) represents the signals which the first UE 110 receive from the first BS 100 and the second BS 120 that is the interference BS.

In equations (1) and (2), y indicates a signal which the first UE 110 receives for each antenna, x indicates a signal transmitted from a corresponding BS, and h indicates a channel value of a wireless communication environment for each signal. Further, n indicates a noise signal generated in the antenna of the first UE 110 and p indicates a transmission power value of each transmitted signal. Furthermore, D and I in each signal indicate a desired signal and an interference signal, respectively.

In equations (1) and (2), a plurality of signals may be indicated according to the number of antennas, but in the following description, it is assumed that a signal is received using one antenna.

An operation of a receiver of a UE of the related art includes an operation of estimating a channel value h by using a reception signal y and a specific reference signal, decoding a signal based on the estimated channel value, and determining whether a reception of a signal is successful. In order to perform such an operation, the accurate estimation of the channel value is important. For the accurate estimation of the channel value, a signal, i.e., a Reference Signal (RS), having a predetermined pattern between the BS and the UE, is used.

A value of a transmission signal x corresponding to a position of the RS may be re-generated based on information received from the BS by the UE. In this case, when only a noise is received in the signal of equation (1), a channel estimation performance is determined according to a Signal to Noise Ratio (SNR). In general, when the SNR is high, the channel may be accurately estimated, thereby increasing a decoding success possibility of the UE.

However, in the environment of equation (2), i.e., an environment including the interference signal, even when the SNR is high, the interference signals $x^I$ and $h^I$ affect the channel estimation performance. Especially, when the interference signal exists and the channel estimation for the interference signal is not accurate, the interference signal itself affects the desired signal, resulting in the deterioration of the performance of the UE.

In order to address the aforementioned problem, an Interference Whitening (IW) method, a symbol level joint detection method, a bit level detection method, etc. are used in the related art.

The IW method is a method of improving performance of the receiver by ignoring the interference signal received from the interference BS or assuming that the interference signal is a noise. The IW method will now be described with reference to equations (3) to (6).

The received signal of equation (2) may be indicated as equation (3).

$$y = \sqrt{p_D} h^D x^D + v (v = \sqrt{P_I} h^I x^I + n) \tag{3}$$

In equation (3), v indicates an addition of the remaining signals, except for the desired signal to be received. A covariance for the signal v is represented as equation (4).

$$R_v = P_I h^I h^{I+} + \sigma_n^2 I \tag{4}$$

In equation (4), $R_v$ indicates a covariance value for the signal v, $\sigma_n^2$ indicates a noise variance, and I indicates an identity matrix.

The calculated covariance value may be represented as equation (5) by using various decomposition schemes, e.g., a Cholesky decomposition scheme.

$$R_v = P_v^{-1/2} R_v^{1/2} \tag{5}$$

An IW method of the related art is performed by applying a decomposition result value obtained by using equation (5) to the reception signal y. Through the aforementioned method, a result, such as equation (6), is generated. In equation (6), ỹ indicates a result signal according to the IW, so that the decoding process may be performed by using a receiver which does not consider the interference.

$$\tilde{y} = P_v^{-1/2} y = \sqrt{P_D} R_v^{-1/2} h^D x^D + \tilde{v} \tag{6}$$

The IW method is a method of improving a reception performance by converting the interference signal to a noise when it is determined that it is possible to apply a whitening scheme to the interference signal. Accordingly, when it is desired to use the IW method, the construction for accurately determining a strength of the interference signal is additionally implemented and it is determined whether to apply the whitening scheme to the interference signal. Further, since the performance of the IW method is greatly varied according to a rank of the interference signal and the number of reception antennas, there is a problem of failing to regularly maintain the performance according to the wireless communication environment.

Next, the symbol level joint detection method will be described.

The symbol level joint detection method is a method of improving the performance of the receiver by detecting modulation information on the interference signal received from the interference BS and then joining the modulation information and interference information by a UE of the serving BS (hereinafter, referred to as a "serving cell UE"). That is, the symbol level joint detection method is a method of detecting a normal signal to be received from the serving BS considering a transmission scheme (e.g., a modulation order) of the interference signal received by the serving cell UE. For the performance of the method, the serving cell UE detects the modulation information on the interference signal or receives information on interference from the serving BS.

The symbol level joint detection method provides excellent performance compared to the IW method, but a difference of the performance is very large according to the indirect detection of the interference signal from the reception signal without receiving the interference information from the serving BS. Further, the symbol level joint detection method has a shortcoming in that there is a noticeable degradation of the detection performance for a higher modulation order, such as 64 Quadrature Amplitude Modulation (64QAM), compared to the detection performance for a lower modulation order, such as Quadrature Phase Shift Keying (QPSK) and 16QAM.

Next, the bit level detection method will be described.

The bit level detection method is a method, in which a serving BS transmits interference control information received from an interference BS to a serving cell UE for the serving cell UE and the serving cell UE decodes and uses an interference signal of the interference cell UE based on the interference control information, thereby more accurately removing the interference signal.

The bit level detection method has a high complexity, but shows an excellent performance compared to the symbol level joint detection method. That is, the bit level detection method may maximize the performance of the UE in an aspect that the method may use every available signal. However, since the UE continuously monitors the interference control information, substantial power is consumed and the interference control information has a structure that is susceptible to error (e.g., a false alarm).

Further, in a wireless communication system, such as an LTE system, using a protocol by which control information, e.g., information on a transmission mode and an IDentifier (ID) of a UE, transmitted over a long period between a BS and a UE and control information, e.g., HARQ, Modulation and Coding Scheme (MCS), and resource information, transmitted in the unit of a frame are discriminated from each other and transmitted, when the UE fails to receive the control information transmitted over a long period, there is a problem in that the UE may not accurately acquire the control information on the interference signal even if the UE has properly received the control information transmitted in the unit of a frame. Further, when the control information on the interference signal is not accurately decoded, the efficiency of the interference recognition communication is deteriorated.

In the meantime, in order to use the symbol level joint detection method and the bit level detection method, the serving cell UE searches for the minimum information capable of inducing information on signals transmitted by the interference BS by itself. Or, the serving cell UE receives information on a plurality of transmission signals of the interference BS, which may generate the interference to the serving cell UE, from the serving BS. To this end, the serving BS may receive the interference control information from the interference BS through a backhaul channel 140, etc. illustrated in FIG. 1 and transmit the received interference control information to the serving cell UE.

Figure 2:
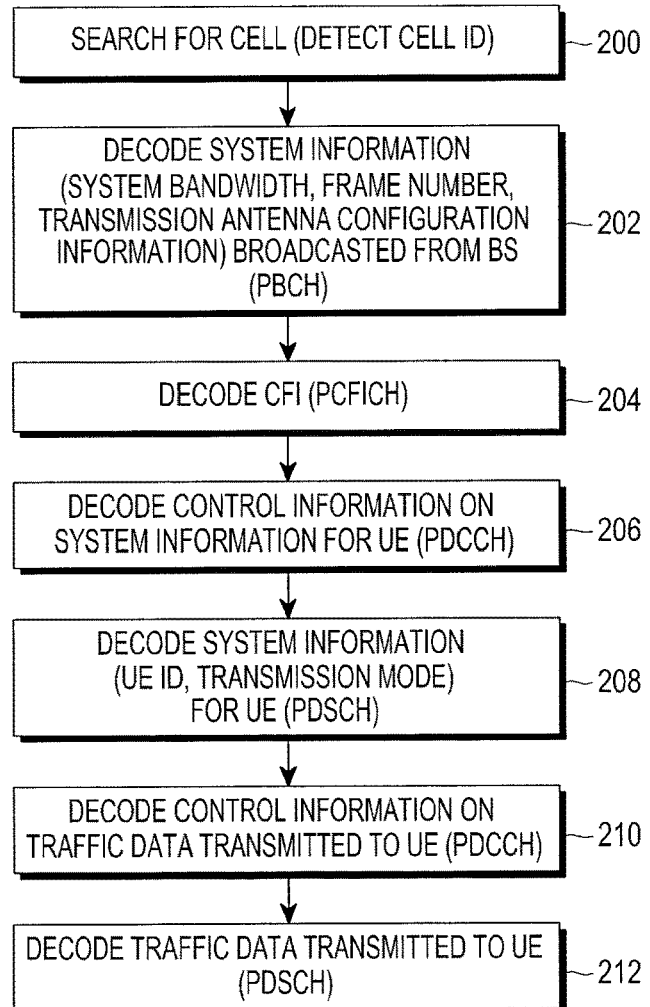
FIG. 2 is a flowchart illustrating a process of decoding a signal received from a Base Station (BS) by a User Equipment (UE) in a wireless communication system according to the related art.

In the meantime, in order for the serving cell UE to receive the interference control information, a process of processing information by the UE illustrated in FIG. 2 is performed.

FIG. 2 is a flowchart illustrating a process of decoding a signal received from a BS by a UE in the wireless communication system according to the related art.

FIG. 2 illustrates an example of a case where the wireless communication system is an LTE system. However, the example is equally applicable to other wireless communication systems. FIG. 2 is a flowchart illustrating a process according to a general flow, and does not necessarily reflect a temporal flow.

Referring to FIG. 2, the UE detects a cell ID of a cell to which the UE currently belongs through a cell search operation in step 200. Next, the UE receives and decodes system information, i.e., a Master System Information (MIB) block, broadcasted from the BS based on the detected cell ID in step 202. The MIB may include one or more of a system bandwidth, a frame number, transmitter antenna configuration information, etc., and may be transmitted through a Primary Broadcast control CHannel (PBCH).

In step 204, the UE decodes a Control channel Format Indicator (CFI) transmitted through a Physical Control Format Indicator CHannel (PCFICH) based on the information acquired in steps 200 and 202. The CFI, which is UE specific information, indicates an area of a resource corresponding to a control channel. The UE determines that it is possible to use the remaining areas, other than the area indicated by the CFI, as data areas.

In step 206, the UE decodes control information on system information for the UE based on the information acquired in steps 200 through 204. The control information is transmitted through a Physical Downlink Control CHannel (PDCCH). A PDCCH area for transmitting the control information includes a Common Search Space (CSS), in which the control information may be decoded without using the specific information on the UE.

In step 208, the UE decodes the system information for the UE based on the information acquired in steps 200 through 206. The system information includes an ID of the UE and information controlled over a long period, such as a transmission mode including a Multiple Input Multiple Output (MIMO) mode. Further, the system information is transmitted through a Physical Downlink Shared CHannel (PDSCH) and may be transmitted in various patterns and various cycles according to a type of corresponding information.

In step 210, the UE decodes control information on traffic data transmitted to the UE based on the information acquired in steps 200 through 208. The control information is transmitted through the PDCCH. The control information includes one or more of a modulation order, a resource allocation, a pre-coding matrix, a HARQ process number, a new data indicator, a redundancy version, a HARQ swap flag, etc. A PDCCH area for transmitting the control information on the traffic data is referred to as a UE specific Search Space (USS), and the control information may be decoded in the USS only when information on a decoding start position is acquired by using information on the ID of the UE.

In step 212, the UE decodes the traffic data transmitted to the UE based on the information acquired in steps 200 through 208. The traffic data is transmitted through the PDSCH.

The UE performs the process of FIG. 2 in order to demodulate the signal of the serving BS. In this case, one of the most important items of information for the demodulation is an information block size. A scheme of transmitting the information block size in the LTE system is related to the HARQ operation. The HARQ operation includes an operation, in which, when the decoding of a reception signal fails, a UE simultaneously stores the reception signal and transmits a signal indicating the failure of the decoding of the reception signal to a serving BS, thereby enabling the serving BS to determine whether to re-transmit the corresponding signal. In general, the LTE system supports the HARQ operation for the data transmission.

In the HARQ used in most wireless communication systems, when the UE fails to decode the reception signal, the serving BS transmits another signal generated based on the same information as that on the initial transmission in retransmitting the signal, so that the UE may obtain a gain by re-combining the retransmitted signal with the initially transmitted signal.

However, contrary to HARQ of the related art, a process of acquiring an information block size for the decoding is changed according to a step of performing the HARQ operation in the HARQ used in the LTE system. That is, in the LTE system, the UE detects and decodes the information block size (i.e., transport block size) from the initially transmitted control information, and stores the corresponding information block size when the UE fails to decode. Then, when the same signal as the corresponding signal is retransmitted, the UE is not able to extract the information block size from control information on the retransmitted signal, so that the UE stores the information block size stored in the initial transmission of the same HARQ packet.

Hereinafter, exemplary embodiments of the present invention will be described in detail.

The exemplary embodiments of the present invention provide a method and an apparatus for reducing interference from a neighboring BS by a UE belonging to each cell in a wireless communication system including a plurality of BSs. More particularly, the exemplary embodiments of the present invention provide a method and an apparatus for transmitting transmission scheme information through which a characteristic of a signal transmitted from an interference BS may be recognized as new control information (i.e., interference control information) to a serving cell UE by a serving BS.

In the following exemplary embodiments of the present invention, the interference control information transmitted to the serving cell UE is defined as Proprietary-Downlink Control Information (P-DCI). The P-DCI includes information on a transmission scheme of the interference BS for the interference cell UE and information on an operation of a BS network. Contents on the information contained in the P-DCI will be described in detail further below.

The exemplary embodiments of the present invention suggest a technique for using the P-DCI based on a mobile communication standard and provide a method and an apparatus for efficiently reducing influence of interference by discriminating an initial transmission and a retransmission in the wireless communication system using the HARQ retransmission scheme as one example.

First, an example of the wireless communication system according to an exemplary embodiment of the present invention will be described with reference to FIG. 3.

Figure 3:
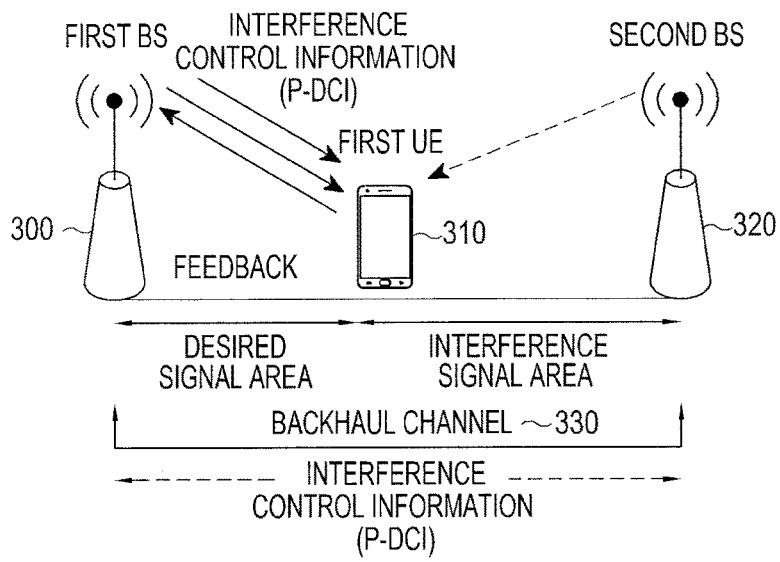
FIG. 3 is a diagram illustrating a wireless communication system according to an exemplary embodiment of the present invention.

FIG. 3 is a diagram illustrating a wireless communication system according to an exemplary embodiment of the present invention.

Referring to FIG. 3, the wireless communication system includes a first BS 300, a first UE 310 receiving a signal from the first BS 300, a second BS 320 which is a neighboring BS of the first BS 300, and a second UE (not shown) receiving a signal from the second BS 320.

The first BS 300 and the second BS 320 represent transmitters used in a wireless communication system. For example, when the wireless communication system is the LTE system, each of the first BS 300 and the second BS 320 may be an evolved Node B (eNodeB), and when the wireless communication system is the UMTS (WCDMA) system, each of the first BS 300 and the second BS 320 may be a Node B (NodeB). Further, when the wireless communication system uses a signaling for conforming to a communication standard, each of the first BS 300 and the second BS 320 may be a BS having a broad meaning including an Evolved Packet Core (EPC) or a Radio Network Controller (RNC).

Further, the backhaul channel 330 is a simplification of various network constructions for connecting the respective BSs in a wireless communication network, and indicates a transmission channel for signaling and exchanging data between different BSs in the exemplary embodiment of the present invention. The first BS 300 and the second BS 320 may share information through the backhaul channel 330.

More particularly, the first BS 300 and the second BS 320 share information on a plurality of UEs of which the performance may be degraded due to the inter cell interference. The first BS 300 determines information on the interference cell UE sharing the same resource (also referred to as the resource that is "co-scheduled" between the BSs) with a specific UE desiring to currently transmit a signal based on the information received from the second BS 320 (and possibly one or more BSs in addition to the second BS 320) which is the neighboring BS within a specific cell.

The first BS 300 generates interference control information, i.e., the P-DCI, for the first UE 310 by using the information on the interference cell UE and transmits the generated P-DCI to the first UE 310. Also, the first BS 300 may transmit the generated P-DCI to the second BS 320 through the backhaul channel 330.

The first BS 300 transmits the P-DCI using a CSS area within the PDCCH area of the serving cell. As described above, in the CSS area, the signal may be demodulated without using the information on the ID of the UE. The first UE 310 may not determine whether the P-DCI exists before the reception of the P-DCI, and thus demodulates the P-DCI in a state of not being aware of the ID of the UE for the interference signal, so that the P-DCI is transmitted by using the CSS area.

However, when the first UE 310 has already acquired the ID of the UE for the interference signal, the P-DCI may also be transmitted by using the USS area. Further, the P-DCI is the interference information, but may be transmitted after being masked using the ID, e.g., a Cell-Radio Network Temporary Identifier (C-RNTI) or a UE-RNTI, of the serving cell UE.

Accordingly, the first UE 310 may achieve excellent performance by using the efficient detection and decoding scheme based on the P-DCI received from the first BS 300, compared to a case where no interference information is used.

In the meantime, FIG. 3 has been described based on an example of a case in which the first UE 310 receives the P-DCI from one BS, i.e., the first BS 300, but the first UE 310 may receive the P-DCI from one or more other neighboring BSs, as well as the first BS 300, according to another exemplary embodiment of the present invention. In this case, the first UE 310 may monitor whether the P-DCI is transmitted from any of the plurality of BSs.

In the meantime, a format of the P-DCI according to an exemplary embodiment of the present invention may be represented as Table 1.

TABLE 1

| Parameter | Explanation | Bits |
| --- | --- | --- |
| Transport block to codeword swap flag | Indicates whether to swap a channel when two transport blocks are transmitted through a spatial multiplexing | |
| HARQ process number | HARQ process number of a transport block transmitted in a corresponding subframe | |
| Transport block 1 | Modulation and coding scheme New data indicator (To determine whether to retransmit HARQ information) Redundancy version (Information on a start position of a transmitted packet within an encoded packet) | |

TABLE 1-continued

| Parameter | Explanation | Bits |
|---|---|---|
| Transport block 2 | Modulation and coding scheme<br>New data indicator<br>Redundancy version | 5 |
| Pre-coding information | Pre-coding matrix index for an interference signal when the interference signal is transmitted using the pre-coding | |
| Cell ID | Interference Cell ID | |
| UE ID | Interference UE ID | 6 |
| Transmission mode | Interference transmission mode | |
| CFI | Interference control formation indicator | |
| Total | Total number of bits of P-DCI | 2 |

As illustrated in Table 1, the P-DCI includes the "Transport block to codeword swap flag" indicating whether to swap the channel when two transport blocks are transmitted through a spatial multiplexing in the interference cell; the "HARQ process number" indicating a HARQ process number of a transport block transmitted in a corresponding subframe; the "Transport block 1" and the "Transport block 2" including information on a modulation scheme and a coding scheme, and information on a new data indicator and information on a redundancy version, respectively; the "Pre-coding information" indicating a pre-coding matrix index for an interference signal when the interference signal is transmitted using the pre-coding; the "Cell ID" indicating an ID of an interference cell; the "UE ID" indicating an ID of an interference cell UE; the "Transmission mode" indicating a transmission mode used in an interference cell; the "CFI" indicating an interference control information indicator; and the "Total" indicating the total number of bits of the P-DCI.

The "Transport block 1', the "Transport block 2", "HARQ process number", and "Transport block to codeword swap flag" among the information in the P-DCI represented in Table 1 are information which the first UE 310 uses for the decoding of the interference information. Further, the "HARQ process number", and the "new data indicator" and the "redundancy version" included in the "Transport block 1" and the "Transport block 2" among the information in the P-DCI are information used for the process of the HARQ retransmission.

For the performance of the decoding of the signal, information on a size of an information block is generally needed. In the LTE system, the information on the information block size may be acquired based on the information on the modulation scheme and the coding scheme, the resource block information, and the information indicating whether the HARQ retransmission is performed. The information indicating whether the HARQ retransmission is performed may be acquired based on whether the information of 1 bit included in the "new data indicator" of the "transport block 1" and the "transport block 2" is toggled (i.e., an operation of changing "0" to "1" or changing "1" to "0"). That is, when the information of 1 bit included in the "new data indicator" is toggled, it is determined as the HARQ initial transmission, but when the information of 1 bit included in the "new data indicator" is not toggled, it is determined as the HARQ retransmission.

When the information of 1 bit included in the "new data indicator" is toggled so that it is determined as the HARQ initial transmission, the UE determines a size of the information on the received interference signal, i.e., a transport block size, by using the information on the "modulation and coding scheme" among the information on the P-DCI and information on a Resource Block (RB) within a serving DCI of the UE. Further, the UE detects and decodes the interference signal based on the transport block size and removes the interference signal from the reception signal.

When the information of 1 bit included in the "new data indicator" has not been toggled so that it is determined as the HARQ retransmission, the UE has difficulty in determining the transport block size, so that the UE detects the interference signal based on the information on the "modulation and coding scheme". Further, the UE decodes the reception signal without decoding the interference signal.

In the meantime, the P-DCI may be transmitted over, for example, a subframe period, but the transmission period of the P-DCI is not limited thereto and may be variously changed. The P-DCI may include the entirety or a part of the information represented in Table 1 according to an exemplary embodiment of the present invention.

For example, the P-DCI may be configured in a form including only information on a transmission mode used in the interference cell as represented in Table 2. That is, when a load of the serving BS is large, the serving BS may transmit the P-DCI configured with parameters represented in Table 2 to the UE. In this case, the UE may acquire corresponding information by directly receiving and decoding the remaining information (e.g., the remaining information included in Table 1 excluding the information included in Table 2) for the detection or the decoding of the interference signal.

TABLE 2

| Parameter | Explanation | Bits |
|---|---|---|
| Transmission mode | Interference transmission mode | 2 |
| CFI | Interference control information indicator | 2 |
| Total | Total number of bits of P-DCI | 4 |

In the meantime, the P-DCI may be configured in another format including information represented in Table 3.

TABLE 3

| Parameter | Explanation | Bits |
|---|---|---|
| Transport block to codeword swap flag | Indicates whether to apply a swapped channel when two transport blocks are transmitted through a spatial multiplexing | 1 |
| Transport block 1 | Modulation and coding scheme | 5 |
| Transport block 2 | Modulation and coding scheme | 5 |
| Transmission mode | Interference transmission mode | 2 |
| CFI | Interference control information indicator | 2 |
| Total | Total number of bits of P-DCI | 15 |

As represented in Table 3, the P-DCI may be configured in the format including information, through which information on a modulation order may be acquired, among various interference information. It may not be possible to use the information on the modulation order for the decoding of the interference signal. However, the information on the modulation order may be used for the detection of the interference signal. Accordingly, even if the P-DCI configured with the information represented in Table 3 is transmitted, the UE recognizes the interference signal, thereby reducing the influence of the interference signal.

In the meantime, three formats of the P-DCI represented in Tables 1 to 3 have been suggested in the exemplary embodiments of the present invention, but the format of the P-DCI is not limited thereto and may include various combinations of the information represented in Table 1 as a matter of course.

Hereinafter, a process of the operation of the serving BS according to an exemplary embodiment of the present invention will be described with reference to FIG. 4.

Figure 4:
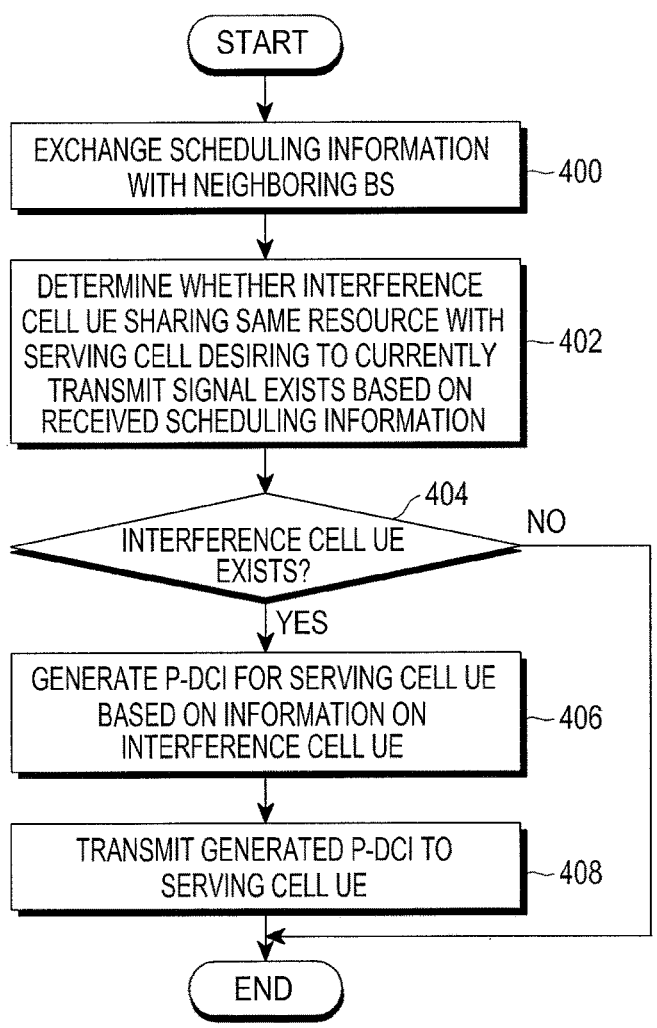
FIG. 4 is a flowchart illustrating a process of transmitting Proprietary-Downlink Control Information (P-DCI) by a serving BS according to an exemplary embodiment of the present invention.

FIG. 4 is a flowchart illustrating a process of transmitting P-DCI by a serving BS according to an exemplary embodiment of the present invention.

Referring to FIG. 4, the serving BS exchanges scheduling information with a neighboring BS in step 400. That is, the serving BS transmits the scheduling information for UEs within a serving cell to the neighboring BS and receives scheduling information for UEs within a neighboring cell from the neighboring BS. The scheduling information may be periodically exchanged. Alternatively, the scheduling information may be exchanged based on a triggering event.

The serving BS determines whether an interference cell UE using the same resource as that used in at least one serving cell UE desiring to currently transmit a signal exists based on the received scheduling information in step 402.

When the serving BS determines that the interference cell UE exists in step 404, the serving BS generates P-DCI for the serving cell UE based on the information on the interference cell UE in step 406. The information on the interference cell UE may be acquired from the received scheduling information, and may include, for example, an ID of the interference cell, an ID of the interference cell UE, and a transmission mode of the interference cell, etc. When the generation of the P-DCI is completed, the serving BS transmits the generated P-DCI to the serving cell UE in step 408.

In the meantime, when the serving BS determines that the interference cell UE does not exist in step 404, the serving BS determines that there is no interference signal and completes all processes.

Next, a process of an operation of a UE according to an exemplary embodiment of the present invention will be described with reference to FIG. 5.

Figure 5:
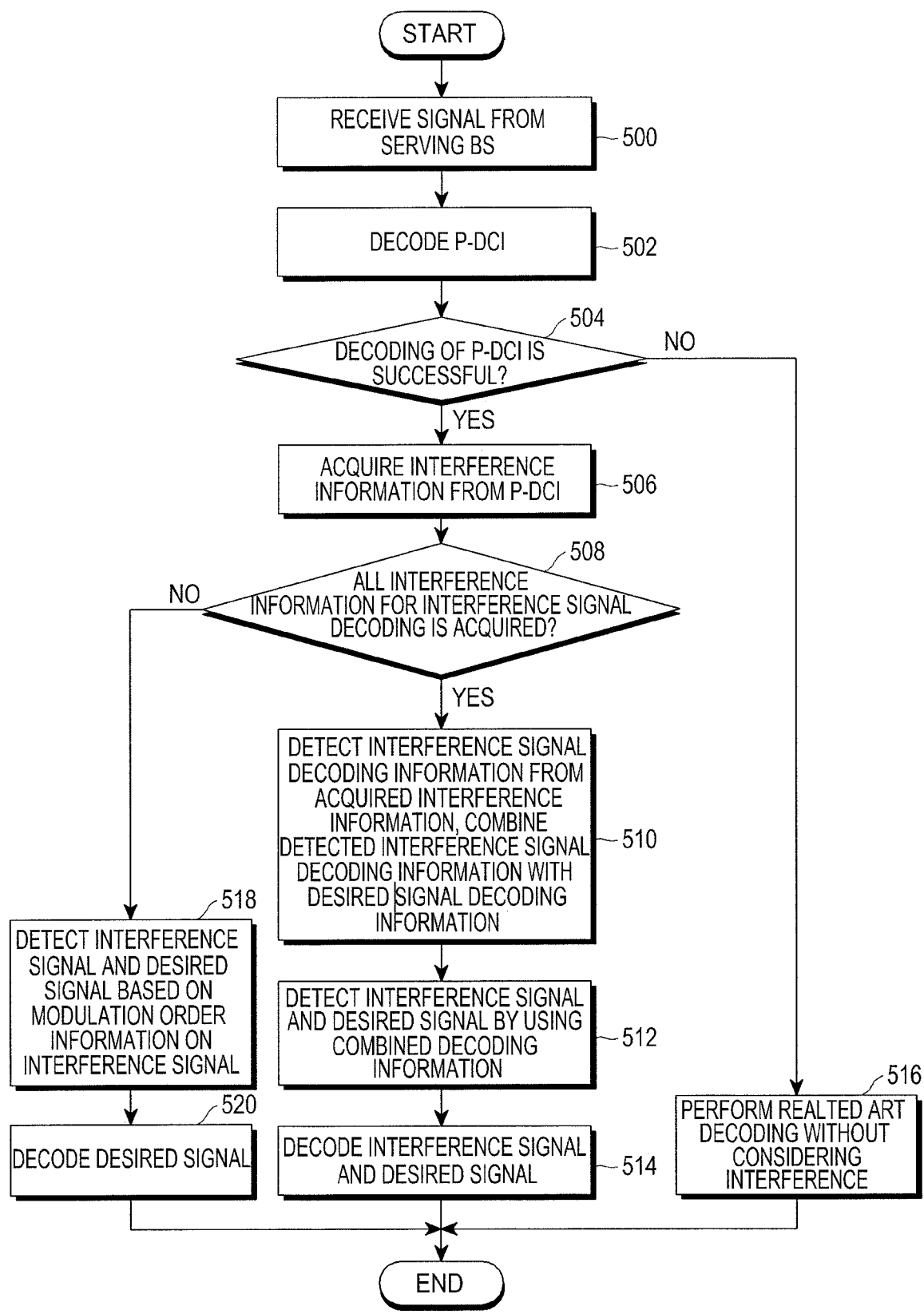
FIG. 5 is a flowchart illustrating a process of receiving P-DCI by a UE according to an exemplary embodiment of the present invention.

FIG. 5 is a flowchart illustrating a process of receiving P-DCI by the UE according to the exemplary embodiment of the present invention.

Referring to FIG. 5, the UE receives a signal from a serving BS and decodes the signal for a CSS area in step 500. Further, when the P-DCI is transmitted through the CSS area in which the decoding is performed (i.e., in a case where the P-DCI is transmitted through the USS area when an ID of the UE is acquired), the UE decodes the P-DCI in step 502.

The UE determines whether the decoding of the P-DCI is successful in step 504. When the decoding of the P-DCI fails, the UE determines that there is no interference or that it is not able to identify interference information, and proceeds to step 516 of performing a decoding process of the related art without considering the interference.

However, when the decoding of the P-DCI is successful, the UE proceeds to step 506 to acquire the interference information from the decoded P-DCI. Next, the UE determines whether all interference information for the decoding of the interference signal is acquired in step 508. For example, the UE determines whether all interference information represented in Table 1 or the information on the modulation order for the interference signal represented in Table 3 is acquired. Here, in making this determination, the UE may consider remaining information that it can receive and decode as part of the acquired interference information for the decoding of the interference signal. For example, when the interference information represented in Table 2 is acquired, the UE may determine this as scenario where all interference information for the decoding of the interference signal is acquired because the UE can acquire the remaining information for the decoding of the interference signal. In the case where the interference information represented in Table 2 is acquired, the UE will receive and decode the remaining information for the decoding of the interference signal.

When the UE acquires all interference information for the decoding of the interference signal, the UE detects information for the decoding of the interference signal from the acquired interference information and combines the detected information for the decoding of the interference signal with information for the decoding of a desired signal in step 510. Next, the UE detects the interference signal and the desired signal from the received signal by using the combined decoding information in step 512. Further, the UE decodes the detected interference signal and the detected desired signal and removes the decoded interference signal from the received signal in step 514.

In the meantime, when the UE does not acquire all interference information for the decoding of the interference signal, i.e., acquires the information on the modulation order for the interference signal, the UE detects the interference signal and the desired signal based on the information on the modulation order for the interference signal in step 518. The information on the modulation order for the interference signal may not be used for the decoding of the interference signal, but may be used for the detection of the interference signal. Next, the UE excludes the detected interference signal from the received signal and decodes the detected desired signal in step 520.

Hereinafter, a construction of the serving BS and the UE according to exemplary embodiments of the present invention will be described with reference to FIGS. 6 and 7.

Figure 6:
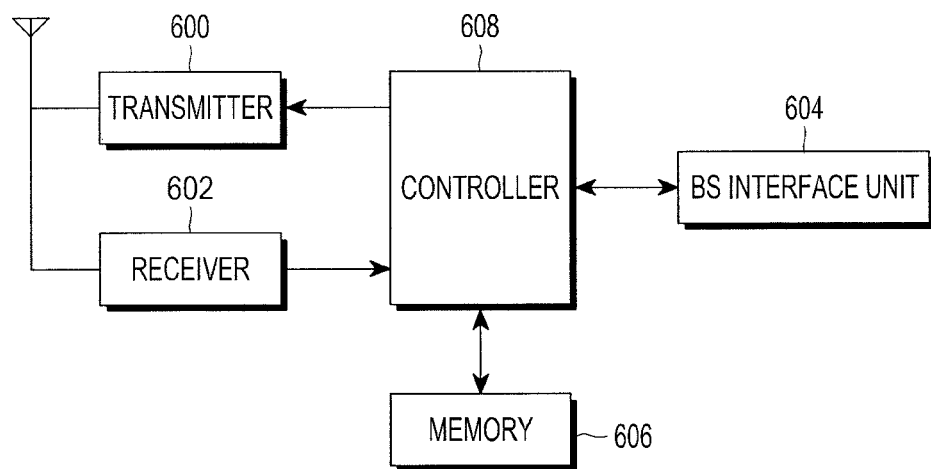
FIG. 6 is a block diagram illustrating a serving BS according to an exemplary embodiment of the present invention.

FIG. 6 is a block diagram illustrating a serving BS according to an exemplary embodiment of the present invention.

Referring to FIG. 6, the serving BS includes a transmitter 600, a receiver 602, a BS interface unit 604, a memory 606, and a controller 608.

The transmitter 600 and the receiver 602 are elements used for performing communication with a serving cell UE. That is, the transmitter 600 transmits a signal and data to the serving cell UE, and the receiver 602 receives a signal and data from the serving cell UE. Although it is not illustrated in FIG. 6, the transmitter 600 may include an encoder and a modulator for encoding and modulating a transmission signal.

The BS interface unit 604 performs communication with at least one neighboring BS. More particularly, the BS interface unit 604 exchanges scheduling information with the neighboring BS. That is, the BS interface unit 604 transmits the scheduling information for UEs within a serving cell to the neighboring BS and receives the scheduling information for UEs within a neighboring cell from the neighboring BS. The scheduling information may be periodically exchanged. Alternatively, the scheduling information may be exchanged based on a triggering event.

The memory 606 stores all information and data generated during the operation of the serving BS. Especially, the memory 606 stores the P-DCI described herein in the exemplary embodiments of the present invention.

The controller 608 determines the operation of the serving BS by controlling the transmitter 600, the receiver 602, the BS interface unit 604, and the memory 606.

The controller 608 controls to exchange the scheduling information with the neighboring BS, and determines whether an interference cell UE sharing the same resource with at least one serving cell desiring to currently transmit a signal exists based on the scheduling information received from the neighboring BS.

When the controller 608 determines that the interference cell UE exists, the controller 608 generates P-DCI for the serving cell UE based on the information on the interference cell UE. The information on the interference cell UE may be acquired from the received scheduling information, and may include, for example, an ID of the interference cell, an ID of the interference cell UE, and a transmission mode of the interference cell. When the controller 608 completes the generation of the P-DCI, the controller 608 controls to transmit the generated P-DCI to the serving cell UE by controlling the transmitter 600. Also, the controller 608 may transmit the generated P-DCI to the neighboring BS through a backhaul channel.

In the meantime, when the controller 608 determines that the interference cell UE does not exist, the controller 608 determines that there is no interference signal and does not generate the P-DCI.

Figure 7:
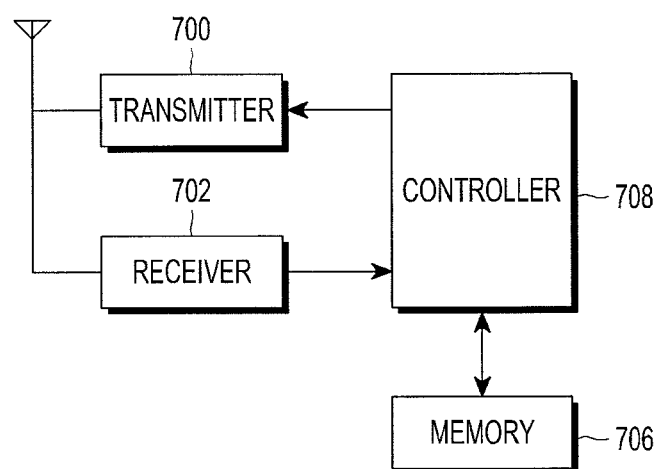
FIG. 7 is a block diagram illustrating a UE according to an exemplary embodiment of the present invention.

FIG. 7 is a block diagram illustrating a UE according to an exemplary embodiment of the present invention.

Referring to FIG. 7, the UE includes a transmitter 700, a receiver 702, a memory 706, and a controller 708.

The transmitter 700 and the receiver 702 are elements for wireless communication of the UE. The transmitter 700 transmits a signal and data to a serving BS, and the receiver 702 receives a signal and data from the serving BS and may receive a signal of a neighboring BS, as an interference signal. Further, although it is not illustrated in FIG. 7, the receiver 702 may include a demodulator and a decoder for demodulating and decoding a reception signal.

The memory 706 stores all information and data generated during the operation of the UE. Especially, the memory 706 stores the P-DCI described herein in the exemplary embodiments of the present invention.

The controller 708 determines the operation of the UE by controlling the transmitter 700, the receiver 702, and the memory 706.

The controller 708 controls to receive a signal from the serving BS and decodes the signal for the CSS area. Further, when the P-DCI is transmitted through the CSS area in which the decoding is performed, the controller 708 decodes the P-DCI.

The controller 708 determines whether the decoding of the P-DCI is successful. When the decoding of the P-DCI is fails, the controller 708 determines that there is no interference or that it is not able to identify interference information, and performs a related art decoding process without considering the interference.

However, when the decoding of the P-DCI is successful, the controller 708 acquires the interference information from the decoded P-DCI. Next, the controller 708 determines whether all interference information for the decoding of the interference signal is acquired. For example, the controller 708 determines whether all interference information represented in Table 1 or the information on the modulation order for the interference signal represented in Table 3 is acquired.

When the controller 708 acquires all interference information for the decoding of the interference signal, the controller 708 detects information for the decoding of the interference signal from the acquired interference information and combines the detected information for the decoding of the interference signal with information for the decoding of a desired signal. Next, the controller 708 detects the interference signal and the desired signal from the received signal by using the combined decoding information. Further, the controller 708 decodes the detected interference signal and the detected desired signal and removes the decoded interference signal from the received signal.

In the meantime, when the controller 708 does not acquire all interference information for the decoding of the interference signal, i.e., acquires the information on the modulation order for the interference signal, the controller 708 detects the interference signal and the desired signal based on the information on the modulation order for the interference signal. The information on the modulation order for the interference signal may not be used for the decoding of the interference signal, but may be used for the detection of the interference signal. Next, the controller 708 excludes the detected interference signal from the received signal and decodes the detected desired signal.

Accordingly, it is not necessary for the exemplary embodiments of the present invention to demodulate the interference control information (e.g., the DCI information) generally used for acquiring the control information for the interference signal or store corresponding interference information.

Further, when the interference control information (i.e., P-DCI) transmitted in the unit of a frame as described herein in the exemplary embodiments of the present invention is used, it is not necessary to monitor and store information on the ID of the UE and the transmission mode allocated over a long period for the decoding of the interference signal.

Further, since the information on the interference signal according to the co-scheduling is transmitted in the exemplary embodiments of the present invention, it is not necessary to transmit information on an allocation type and resource allocation.

Further, the exemplary embodiments of the present invention insert only information used for maximizing the performance to the interference control information, thereby reducing an overhead for the interference control information. Especially, since the exemplary embodiments of the present invention uses the common resource for the co-scheduling, it is possible to acquire the additional information on the interference signal by using both the DCI information and the interference control information of the UE. Further, the exemplary embodiments of the present invention may acquire the information on the transport block size necessary for the decoding of the interference signal based on the information on the modulation scheme and the coding scheme included in the interference control information and the information on the RB included in the DCI of the UE.

Lastly, the exemplary embodiments of the present invention use the C-RNTI (or UE-RNTI) and the common area of the control channel area of the UE, thereby minimizing the number of times of the demodulation of the interference control information performed by the UE.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting control information by a first base station (BS) in a wireless communication system, the method comprising:
receiving from a second BS that is a neighboring BS of the first BS, information related to a downlink transmission by the second BS;

generating, based on the received information, control information used for cancelling an interference caused by the downlink transmission by the second BS, wherein the control information includes a cell identifier associated with the second BS, information on a transmission mode for a second user equipment (UE) served by the second BS, and information on precoding used for the downlink transmission by the second BS; and transmitting, to a first UE in a cell of the first BS, the generated control information, used for cancelling the interference, including the cell identifier associated with the second BS, the information on the transmission mode for the second UE served by the second BS, and the information on the precoding used for the downlink transmission by the second BS, wherein the transmission mode is associated with a multi antenna transmission corresponding to a transmission scheme of a physical downlink shared channel (PDSCH).

2. The method of claim 1, wherein the generated control information is transmitted to the first UE through one of a common search space (CSS) or a UE specific search space (USS) within a physical downlink control channel (PDCCH).

3. The method of claim 1, wherein the generated control information further comprises at least one of a flag indicating whether to swap a channel when two transport blocks are transmitted through a spatial multiplexing, an information assigning resource block, information indicating whether a retransmission is performed, a modulation order, a UE identifier associated with the second BS, an interference control information indicator, or a total number of bits of control information for cancelling the interference caused by the downlink transmission by the second BS.

4. The method of claim 1, wherein, when a load of the first BS is higher than a threshold, the generated control information comprises at least one of a flag indicating whether to swap a channel when two transport blocks are transmitted through a spatial multiplexing, a modulation order, an interference control formation indicator or a total number of bits of control information for cancelling the interference caused by the downlink transmission by the second BS.

5. The method of claim 1, wherein the generated control information further comprises a modulation and coding scheme (MCS) associated with the second BS.

6. A base station (BS) in a wireless communication system for transmitting control information, the BS comprising:
a BS interface configured to receive from a neighbor BS that is a neighboring BS of the BS, information related to a downlink transmission by the neighbor BS;
a transmitter configured to transmit control information to a first user equipment (UE) in a cell of the BS; and
at least one processor configured to:
control the BS interface and the transmitter,
generate, based on the received information, control information used for cancelling an interference caused by the downlink transmission by the neighbor BS, wherein the control information includes a cell identifier associated with the neighbor BS, information on a transmission mode for a second UE served by the neighbor BS, and information on precoding used for the downlink transmission by the second BS, and
control to transmit, to the first UE, the generated control information, used for cancelling the interference, including the cell identifier associated with the neighbor BS, the information on the transmission mode for the second UE served by the neighbor BS, and the information on the precoding used for the downlink transmission by the second BS,
wherein the transmission mode is associated with a multi antenna transmission corresponding to a transmission scheme of a physical downlink shared channel (PDSCH).

7. The BS of claim 6, wherein the at least one processor is further configured to:
control to transmit the generated control information to the first UE through one of a common search space (CSS) or a UE specific search space (USS) within a physical downlink control channel (PDCCH).

8. The BS of claim 6, wherein the generated control information further comprises at least one of a flag indicating whether to swap a channel when two transport blocks are transmitted through a spatial multiplexing, an information assigning resource block, information indicating whether a retransmission is performed, a modulation order, a UE identifier associated with the neighbor BS, an interference control information indicator, or a total number of bits of control information for cancelling the interference caused by the downlink transmission by the neighbor BS.

9. The BS of claim 6, wherein, when the at least one processor determines that a load of the BS is higher than a threshold, the generated control information comprises at least one of a flag indicating whether to swap a channel when two transport blocks are transmitted through a spatial multiplexing, a modulation order, an interference control formation indicator or a total number of bits for cancelling the interference caused by the downlink transmission by the neighbor BS.

10. The BS of claim 6, wherein the generated control information further comprises a modulation and coding scheme (MCS) associated with the neighbor BS.

* * * * *